(12) United States Patent
Tarabulski (10) Patent No.: US 8,341,949 B2
(45) Date of Patent: Jan. 1, 2013

(54) AFTER-TREATMENT SYSTEM

(75) Inventor: Theodore John Tarabulski, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 357 days.

(21) Appl. No.: 12/474,865

(22) Filed: May 29, 2009

(65) Prior Publication Data

US 2009/0293452 A1 Dec. 3, 2009

Related U.S. Application Data

(60) Provisional application No. 61/129,017, filed on May 30, 2008.

(51) Int. Cl.
*F01N 3/00* (2006.01)
(52) U.S. Cl. .................................... 60/301; 60/295
(58) Field of Classification Search ............ 60/286, 60/287, 301, 311
See application file for complete search history.

(56) References Cited

U.S. PATENT DOCUMENTS

| | | | | |
|---|---|---|---|---|
| 5,743,235 A | * | 4/1998 | Lueder | 123/468 |
| 6,192,676 B1 | * | 2/2001 | Zurbig et al. | 60/286 |
| 6,722,124 B2 | * | 4/2004 | Pawson et al. | 60/286 |
| 6,729,127 B2 | * | 5/2004 | Woerner et al. | 60/297 |
| 2005/0252201 A1 | * | 11/2005 | Lecea et al. | 60/286 |
| 2006/0153748 A1 | * | 7/2006 | Huthwohl et al. | 422/172 |
| 2006/0156712 A1 | * | 7/2006 | Buhmann et al. | 60/297 |
| 2006/0266022 A1 | * | 11/2006 | Woerner et al. | 60/295 |
| 2007/0108772 A1 | * | 5/2007 | Shibui et al. | 290/52 |
| 2009/0293452 A1 | * | 12/2009 | Tarabulski | 60/276 |

* cited by examiner

*Primary Examiner* — Thomas Denion
*Assistant Examiner* — Patrick Maines
(74) *Attorney, Agent, or Firm* — Mark R. Hull

(57) ABSTRACT

An after-treatment system is provided, including an after-treatment module. The after-treatment module may include a housing configured to be installed in an exhaust system of an exhaust producing engine such that at least a portion of the exhaust from the engine flows through the housing. The housing may include at least one selective catalytic reduction (SCR) catalyst disposed within the housing and configured to facilitate a reduction reaction with $NO_x$ in the exhaust. In addition, the housing may include at least one $NO_x$ sensor disposed within the housing and configured to take measurements of an amount of $NO_x$ in the exhaust. Further, the housing may include a controller disposed on the housing and configured to receive the $NO_x$ measurements from the $NO_x$ sensor.

18 Claims, 8 Drawing Sheets

AFTER-TREATMENT SYSTEM

RELATED APPLICATIONS

This application claims priority to, and the benefit of, U.S. Provisional Patent Application Ser. No. 61/129,017, filed May 30, 2008, for AFTER-TREATMENT SYSTEM, the entire disclosure of which is fully incorporated herein by reference.

TECHNICAL FIELD

The present disclosure is directed to an after-treatment system and, more particularly, to an after-treatment system including a consolidated after-treatment module.

BACKGROUND

Engines, including diesel engines, gasoline engines, natural gas engines, and other engines known in the art, may exhaust a complex mixture of air pollutants. The air pollutants may be composed of both gaseous constituents, such as $NO_x$, as well as solid material, such as particulate matter. Particulate matter may include ash and unburned carbon particles and is sometimes referred to as soot.

The amount of particulate matter and gaseous pollutants emitted from an engine may be regulated depending on the type, size, and/or class of engine. Due to increased environmental concerns, exhaust emission standards have become more stringent. In order to meet these emissions standards, engine manufacturers have pursued improvements in several different engine technologies, such as fuel injection, engine management, and air induction. In addition, engine manufacturers have developed devices and systems for treatment of engine exhaust after it leaves the engine. Such systems are often referred to as "after-treatment" systems. After-treatment systems may include after-treatment components, such as catalytic converters and particulate traps.

In order to update older and/or less advanced machines, exhaust after-treatment systems are often retrofitted. As after-treatment systems become more complex, retrofitting such systems is also becoming correspondingly difficult. Many after-treatment systems include multiple treatment components (e.g., catalyst, particulate trap, etc.). Some systems may include selective catalytic reduction (SCR) catalysts that utilize a reductant for reducing the amount of $NO_x$ in exhaust. A typical SCR reductant is ammonia, usually delivered in the form of urea. Such systems may include a urea storage tank, a pump, metering equipment, and associated plumbing for delivering urea to the catalysts to support the reduction reaction. In addition, exhaust after-treatment systems may also include sensors for measuring temperature, pressure, flow-rates, etc. and a controller to operate the system.

Thus, after-treatment systems include complex electronics, wiring, plumbing, sensors, and physical components. Because of this complexity, installation of an after-treatment system can require a significant amount of labor, and may necessitate multiple tradesmen to install a single system. In some cases, the cost of installation rivals that of the system itself. Accordingly, it is desirable to provide an after-treatment system for which installation (be it retrofitting or initial manufacturing) is significantly simplified.

At least one system has been developed that attempts to simplify portions of an after-treatment system by consolidating components thereof. U.S. Pat. No. 6,192,676 (the '676 patent) discloses a system including a urea storage container and a control unit associated therewith. The '676 patent discloses that the control unit may be mounted on the urea storage container. The '676 patent, however, does not disclose any consolidation of other after-treatment components. Urea storage containers only represent a small portion of an after-treatment system. Further, in stationary applications (e.g., electric power generation sets), urea storage containers are often remote from the engine and, therefore, may not be a particularly problematic and/or labor-intensive part of the installation process. There remains a need for a simplified after-treatment system configured for a streamlined installation process.

The present disclosure is directed to improvements in existing after-treatment systems.

SUMMARY

In one aspect, the present disclosure is directed to an after-treatment module. The after-treatment module may include a housing configured to be installed in an exhaust system of an exhaust producing engine such that at least a portion of the exhaust from the engine flows through the housing. The housing may include at least one selective catalytic reduction (SCR) catalyst disposed within the housing and configured to facilitate a reduction reaction with $NO_x$ in the exhaust. In addition, the housing may include at least one $NO_x$ sensor disposed within the housing and configured to take measurements of an amount of $NO_x$ in the exhaust. Further, the housing may include a controller mounted on the housing and configured to receive the $NO_x$ measurements from the $NO_x$ sensor.

In another aspect, the present disclosure is directed to an after-treatment system. The after-treatment system may include an after-treatment module configured to be installed in an exhaust system such that at least a portion of the exhaust from the engine flows through the after-treatment module. The after-treatment module may include a housing including after-treatment components. The after-treatment components may include at least one selective catalytic reduction (SCR) catalyst disposed in the housing and configured to facilitate a reduction reaction with $NO_x$ in the exhaust. The after-treatment components may also include one or more $NO_x$ sensors disposed in the housing and configured to take measurements of an amount of $NO_x$ in the exhaust passing therethrough. In addition, the after-treatment components may include a controller disposed on the housing and configured to receive data from one or more of the after-treatment components disposed on or in the housing. The after-treatment system may also include a urea storage tank and a urea dosing module configured to regulate the amount of urea delivered from the urea storage tank to the after-treatment module.

In another aspect, the present disclosure is directed to a method of installing an after-treatment system in an exhaust system of an exhaust producing engine, wherein the exhaust system includes an exhaust conduit. The method may include connecting an exhaust inlet of an after-treatment module and an exhaust outlet of the after-treatment module to the exhaust conduit. The after-treatment module may include a housing configured to be installed in an exhaust system of an exhaust producing engine such that at least a portion of the exhaust from the engine flows through the housing. The after-treatment module may also include at least one selective catalytic reduction (SCR) catalyst disposed within the housing and configured to facilitate a reduction reaction with $NO_x$ in the exhaust. Further, the after-treatment module may include at least one $NO_x$ sensor disposed within the housing and configured to take measurements of an amount of $NO_x$ in the exhaust. Also, the after-treatment module may include a controller disposed on the housing and configured to receive the $NO_x$ measurements from the $NO_x$ sensor. The method may also include positioning a urea storage tank relative to the exhaust system and positioning, in proximity to the exhaust system, a urea dosing module configured to regulate the amount of urea delivered from the urea storage tank to the after-treatment module. In addition, the method may include connecting interconnects between the after-treatment module, the urea storage tank, and the urea dosing module.

DETAILED DESCRIPTION

Reference will now be made in detail to the drawings. Wherever possible, the same reference numbers will be used throughout the drawings to refer to the same or like parts.

Figure 1:
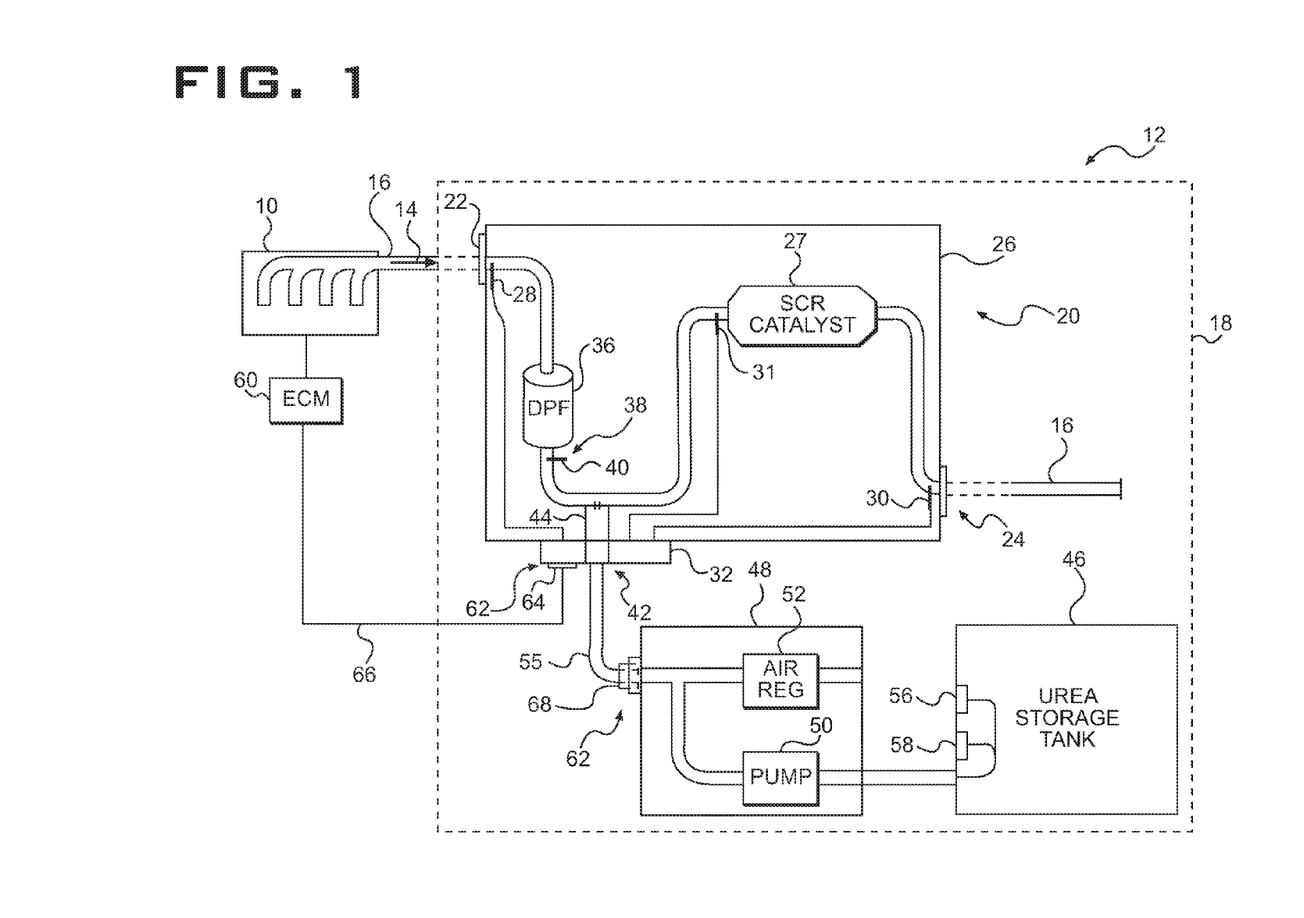
FIG. 1 is a diagrammatic illustration of an after-treatment system according to an exemplary disclosed embodiment.

FIG. 1 shows an exhaust producing engine 10 and an exhaust system 12 configured to carry exhaust gases produced by engine 10 along an exhaust gas flowpath 14 defined, at least in part, by an exhaust conduit 16. FIG. 1 also shows an exhaust after-treatment system 18 associated with exhaust system 12. After-treatment system 18 may include a consolidated after-treatment module 20 configured to be installed in exhaust system 12 such that at least a portion of the exhaust from engine 10 flows through after-treatment module 20. After-treatment module 20 may include an exhaust inlet 22 and an exhaust outlet 24. As shown in FIG. 1, after-treatment module 20 may be installed as part of exhaust system 12, in line with exhaust conduit 16, which may be connected to exhaust inlet 22 and exhaust outlet 24.

In some embodiments, all exhaust produced by engine 10 may be directed through after-treatment module 20. In other embodiments, a portion of the exhaust may either bypass after-treatment module 20 or may be recirculated back to an air intake of engine 10. For example, exhaust system 12 may include an exhaust gas recirculation (EGR) system (not shown) configured to divert a portion of the exhaust from exhaust flowpath 14 prior to passing through after-treatment module 20.

After-treatment module 20 may include a housing 26. Housing 26 may include exhaust inlet 22 and exhaust outlet 24. Housing 26 may include disposed therein, or thereon, several after-treatment components. For example, in the depicted embodiment, housing 26 may enclose at least one selective catalytic reduction (SCR) catalyst 27 configured to facilitate a reduction reaction with $NO_x$ in the exhaust, e.g., converting $NO_x$ (in the presence of $NH_3$) to $N_2$ and $H_2O$. The representation, in FIG. 1, of after-treatment module 20 and the components disposed therein is intended to be generic and merely demonstrative of the general relationship between the disclosed components. See FIGS. 2 and 3 for more detailed illustrations of exemplary layouts for the componentry disposed within housing 26 of after-treatment module 20, including exemplary exhaust flow routing. Exhaust flowpath 14 is shown with arrows throughout the figures.

Housing 26 may also include one or more $NO_x$ sensors configured to take measurements of an amount of $NO_x$ in the exhaust passing therethrough. For example, in some embodiments, housing 26 may enclose an inlet NOx sensor 28 disposed at, or near, exhaust inlet 22 of housing 26; and an outlet NOx sensor 30 disposed at, or near, exhaust outlet 24 of housing 26. Also, in some embodiments, housing 26 may include an SCR inlet temperature sensor 31 configured to measure the temperature of exhaust entering SCR catalyst 27.

In addition, housing 26 may include a controller 32 configured to receive data from one or more after-treatment components housed therein. For example, controller 32 may be configured to receive the $NO_x$ measurements from $NO_x$ sensors 28 and 30. Controller 32 may also be configured to receive other data such as temperature measurements of the exhaust at one or more locations within housing 26. Such temperature measurements may be taken, for example, by one or more temperature sensors, such as SCR inlet temperature sensor 31.

After-treatment module 20 may also include one or more additional after-treatment components. For example, after-treatment module 20 may include various sensors for measuring parameters within housing 26, such as temperatures, pressures, etc. Also, in some embodiments, after-treatment module 20 may include one or more particulate traps 36 (a.k.a., particulate filters, which, in the case of diesel engines, are sometimes referred to as diesel particulate filters or "DPFs") configured to remove particulate matter from the exhaust produced by engine 10. In such embodiments, after-treatment system 18 may include a particulate trap regeneration device 38 disposed within after-treatment module 20 or located upstream therefrom. Regeneration device 38 may include, for example, a flame or plasma producing burner 40 configured to elevate the temperature of exhaust entering particulate traps 36.

After-treatment module 20 may include an inlet for introduction of a reductant in support of the SCR reaction. For example, after-treatment module 20 may include a urea inlet 42 by which urea may be introduced to after-treatment module 20. After-treatment module 20 may include a reductant injector 44 disposed at, or near, urea inlet 42. Reductant injector 44 may be configured to inject a reductant, such as urea, into the exhaust stream flowing through housing 26. Reductant injector 44 may be configured to inject urea into the exhaust stream either upstream or downstream from particulate traps 36 and upstream from SCR catalyst 27.

After-treatment system 18 may include a urea storage tank 46 and a urea dosing module 48 configured to regulate the amount of urea delivered from urea storage tank 46 to after-treatment module 20. Dosing module 48 may include a urea pump 50 configured to pump urea from urea storage tank 46 to after-treatment module 20. Dosing module 48 may also include an air pressure regulator 52, as well as an air solenoid 53 and a urea purge solenoid 54 (see FIG. 9). Dosing module 48 may also include electrical connections associated with air pressure regulator 52, air solenoid 53, urea purge solenoid 54, and pump 50.

After-treatment module 20 may be configured to be operatively connected to urea dosing module 48 via a single urea dosing interconnect 55. Dosing interconnect 55 may be a single wire tube bundle, which may provide communication of urea, air, and electrical signals between after-treatment module 20 and dosing module 48 (such a configuration may sometimes be referred to as an umbilical cable). In addition, in some embodiments, urea storage tank 46 may be operatively connected to after-treatment module 20. For example, in some embodiments, urea storage tank 46 may include a urea level sensor 56 and/or a urea tank temperature sensor 58. Urea level sensor 56 and urea tank temperature sensor 58 may be electronically connected to controller 32, e.g., via dosing module 48 and dosing interconnect 55.

In some embodiments, (e.g., stationary engine applications), urea storage tank 46 may be located remote from engine 10 (and, therefore, remote from after-treatment module 20). Similarly, dosing module 48 may be located remote from after-treatment module 20. For mobile engines, urea storage tank 46 may be located at any suitable location onboard the mobile machine powered by engine 10.

Controller 32 may also be operatively connected with an engine control module (ECM) 60 configured to control operating parameters of engine 10. Controller 32 may, thus, be configured to communicate information about operating parameters of urea storage tank 46, urea dosing module 48 and its components, and after-treatment module 20 and its components to ECM 60. In addition, controller 32 may be configured to receive command information from ECM 60 for controlling any of these components.

After-treatment module 20 may include a wiring harness configured to operatively connect components of after-treatment module 20 with ECM 60, exhaust system 12, and/or other components of after-treatment system 18, such as urea dosing module 48 and/or urea storage tank 46. To facilitate such operative connections, after-treatment module 20 may include one or more consolidated connectors 62 (e.g., multi-pin connectors) configured to interconnect after-treatment module 20 with the various components described above. For example, after-treatment module 20 may include an ECM connector 64 configured to be connected to an ECM interconnect 66. After-treatment module 20 may also include a dosing module connector 68, which may be attached to dosing interconnect 55. The wiring between consolidated connectors 62 and the components of after-treatment module 20 (i.e., SCR inlet temperature sensor 31; $NO_x$ sensors 28 and 30, etc.) may be substantially or completely within housing 26. For example, ECM connector 64 may be located adjacent to housing 26, as shown in FIG. 1. Alternatively, the wiring for one or more of consolidated connectors 62 may extend away from housing 26 in a single bundle. (See, e.g., dosing interconnect 55 and dosing module connector 68 affixed to the end thereof.)

Figure 2:
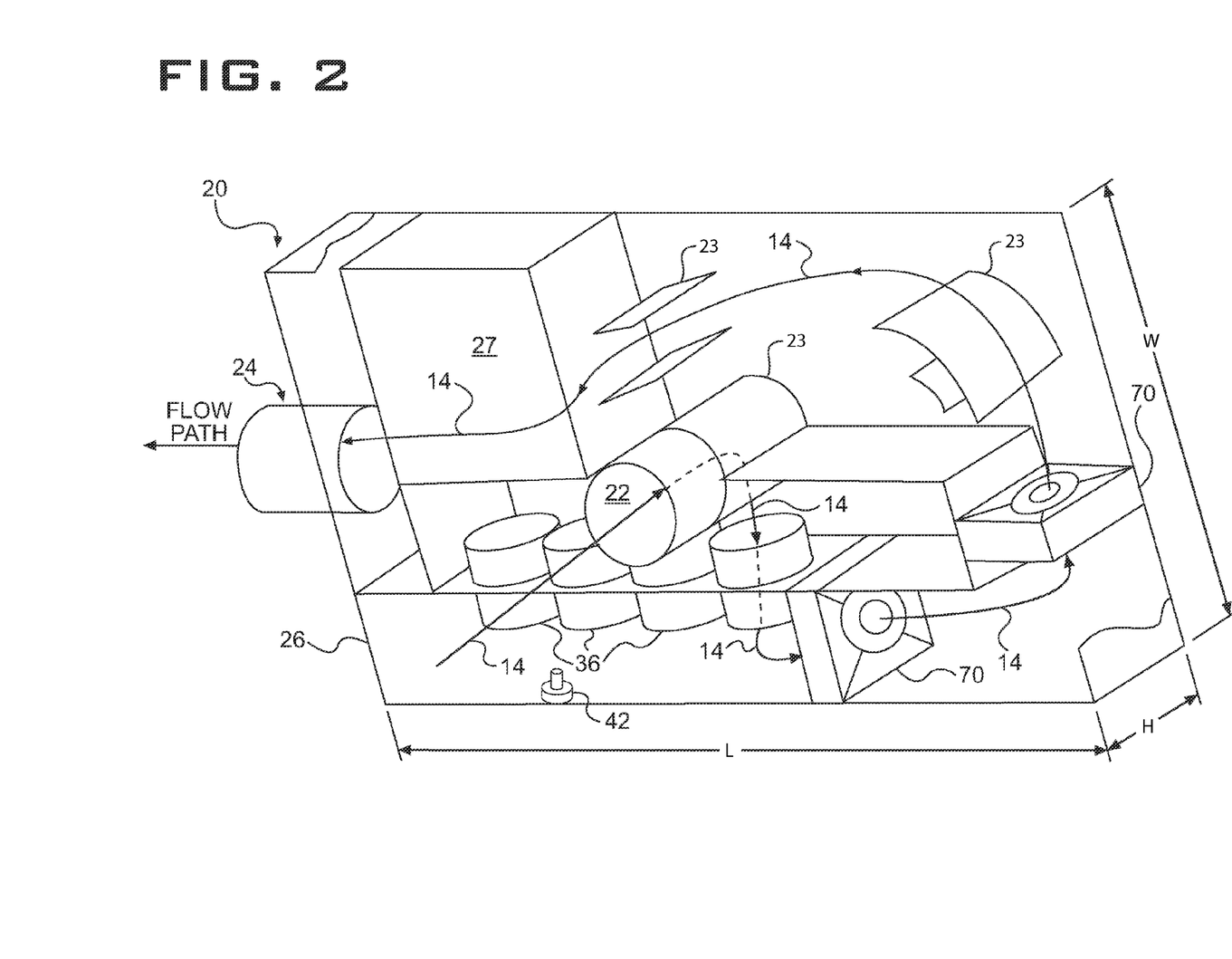
FIG. 2 is a diagrammatic, partial cut-away view of a second exemplary embodiment of an after-treatment module.

FIG. 2 illustrates a second embodiment of an after-treatment module. In the depicted embodiment, after-treatment module 20 includes a box-like housing 26 having a height H that is substantially smaller that a length L and a width W of the housing. In other embodiments, however, housing 26 may be any suitable shape. Housing 26 may include exhaust gas inlet 22 and exhaust gas outlet 24. Exhaust gas inlet 22, in the depicted embodiment, is located on the bottom of housing 26, though module 20 may be oriented if any suitable manner. The location of exhaust gas inlet 22 and the low height profile of housing 26 allow the embodiment to be conveniently mounted onto the top of an exhaust producing system, such as an electric generation set.

As exhaust enters the after-treatment module 20, it may be redirected by a flow baffle 23 through one or more particulate traps 36 to remove particulate matters from the exhaust. Reductant injector 44 is positioned downstream of particulate traps 36 and is configured to inject reductant into the exhaust stream. After the reductant is injected into the exhaust stream, housing 26 may be configured to redirect the exhaust through SCR catalyst 27. The after-treatment module 20 may include additional exhaust baffles 23 to aid in redirecting the exhaust. The after-treatment module 20 may also include one or more mixing devices 70 configured to mix the reductant delivered by reductant injector 44 with the exhaust gases flowing through housing 26. For example, in some embodiments, mixing devices 70 may include structures designed to create turbulence or swirling in the flowing exhaust. Mixing devices 70 may be static structures, e.g., with angled vanes for deflecting exhaust gases in a random or swirling manner. Once through SCR catalyst 27, the exhaust may exit exhaust exit 24. In the depicted embodiment, the exhaust gas outlet 24 is position on the side of the housing 26 to assist in maintaining a low-profile module.

Figure 3:
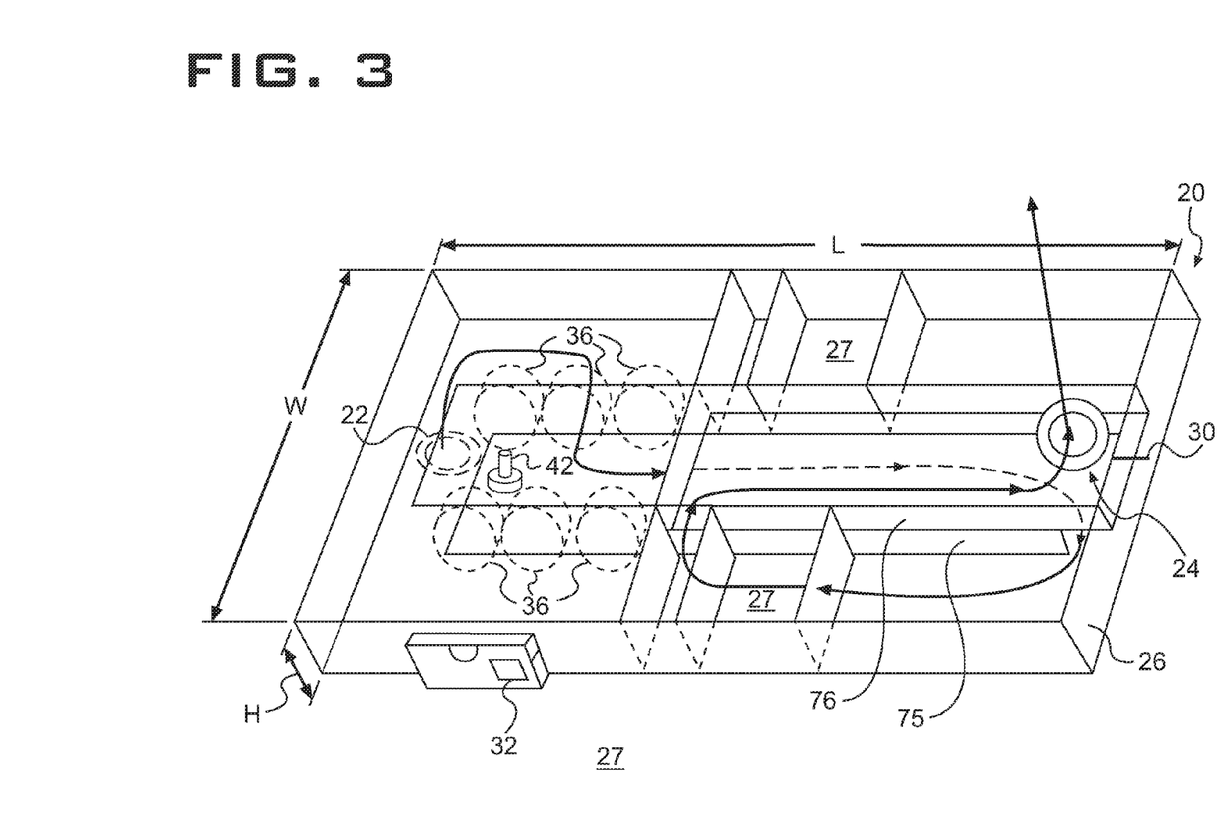
FIG. 3 is a diagrammatic, partial cut-away view of a third exemplary embodiment of an after-treatment module.
Figure 4:
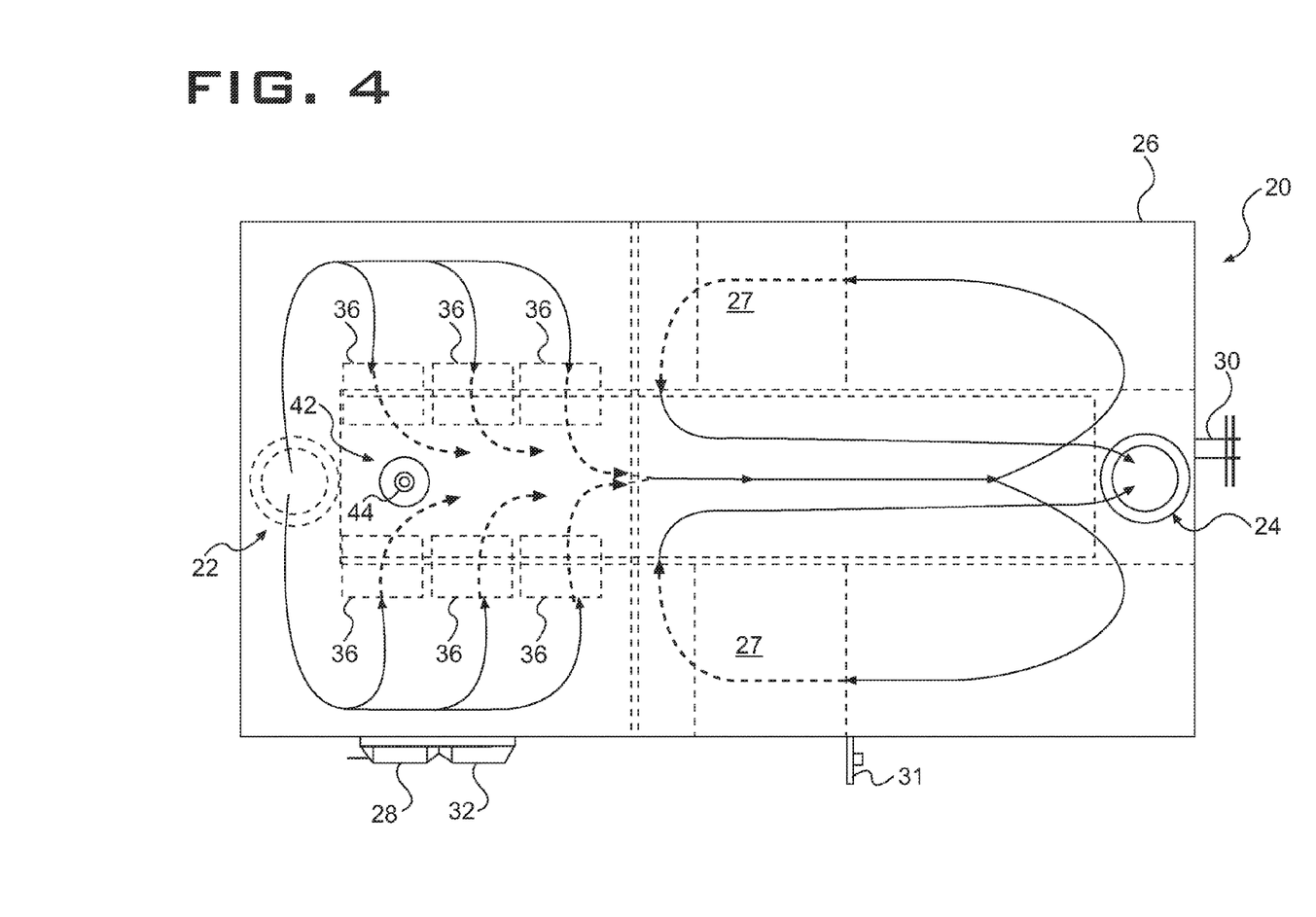
FIG. 4 is a diagrammatic illustration of a top view of the after-treatment module in FIG. 3.
Figure 5:
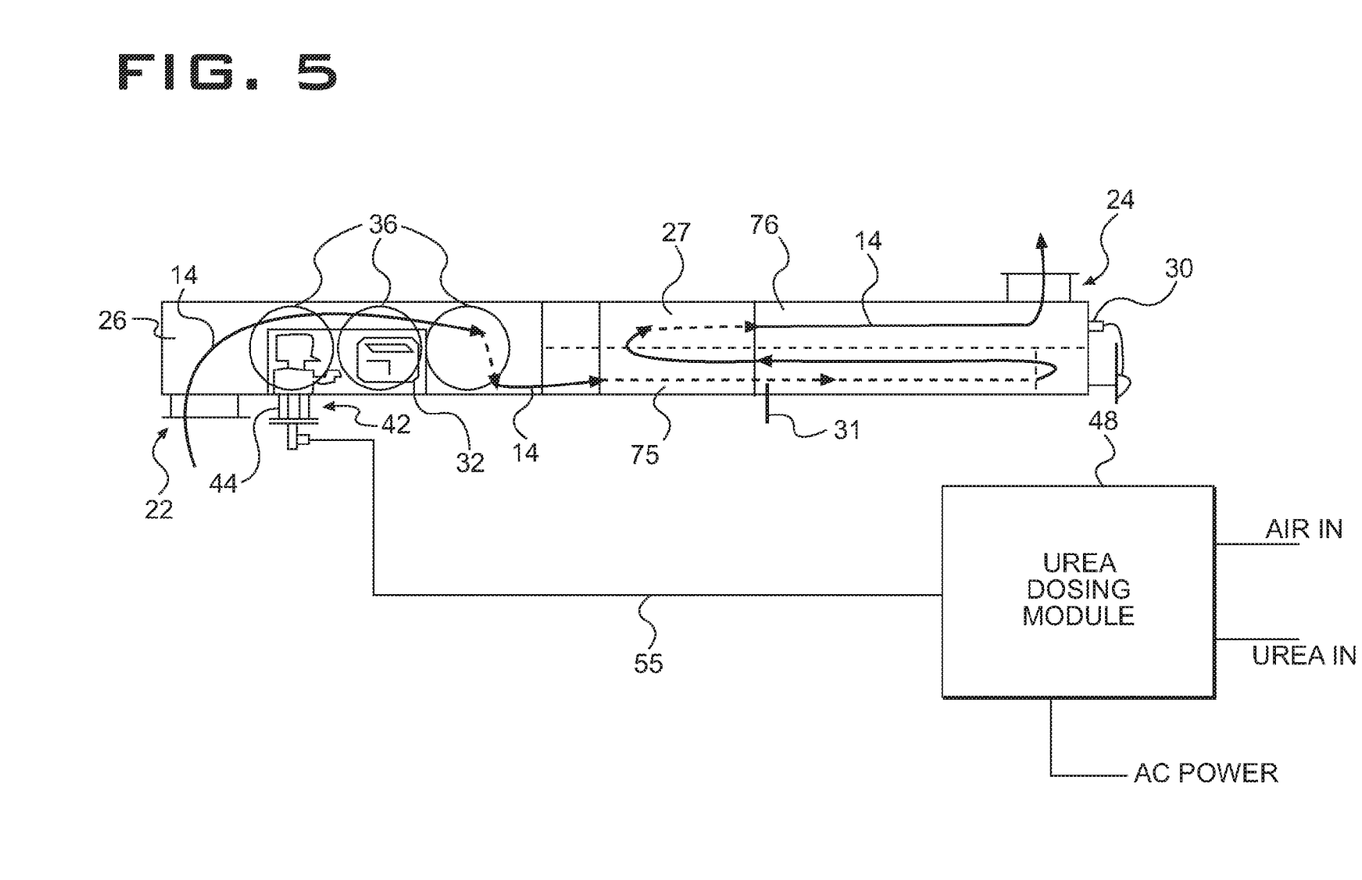
FIG. 5 is a diagrammatic side-view of the after-treatment module in FIG. 3, along with an exemplary urea dosing module attached thereto.

FIGS. 3-5 illustrate a third embodiment of an after-treatment module. In the depicted embodiment, after-treatment module 20 includes a box-like housing 26 having a height H that is substantially smaller that a length L and a width W of the housing. In other embodiments, however, housing 26 may be any suitable shape. Housing 26 may include exhaust gas inlet 22 and exhaust gas outlet 24. The location of exhaust gas inlet 22 and the low height profile of housing 26 allow the embodiment to be conveniently mounted onto the top of an exhaust producing system, such as an electric generation set.

As exhaust enters after-treatment module 20, it splits into two flow paths (see FIG. 4). Each flow path includes a set of particulate traps 36 to remove particulate matters from the exhaust. Each set of particulate traps 36 may include one or more individual traps. Particulate traps 36 and housing 26 may be configured to allow for substantially equal flow of exhaust through each of the particulate traps 36. In addition, one or more flow baffles (not shown) may be utilized to assist in directing the exhaust flow to particulate traps 36.

Particulate traps 36 may be oriented such that exhaust exiting each of the sets of particulate traps 36 merges into a single exhaust flow stream. Reductant injector 44 may be positioned downstream of particulate traps 36 and configured to inject reductant into the merged exhaust stream. After reductant is injected into the exhaust, housing 26 may be configured to redirect the exhaust through one or more SCR catalysts 27.

After-treatment module 20 may include a mixing passage 75. Mixing passage 75 may be configured to provide sufficient flow time and/or turbulence to sufficiently mix the exhaust and reductant before the exhaust stream reaches SCR catalyst 27. The after-treatment module 20 may also include one or more mixing devices (not shown) configured to assist in mixing the injected reductant with the exhaust gases.

In the depicted embodiment, when the exhaust flow reaches the end of mixing passage 75, housing 26 may be configured to split the exhaust flow into two flow paths. Each flow path includes an SCR catalyst 27 to convert $NO_x$ to $N_2$ and $H_2O$. In the depicted embodiment, the exhaust may be redirected substantially 180 degrees from the direction of exhaust flow through the mixing passage 75.

Once through SCR catalysts 27, the module may be configured to merge the two flow streams into a single exhaust flow stream in a merged flow passage 76 and direct the single, merged flow stream out exhaust exit 24 located on the top or side of housing 26 (see FIG. 5). Merged flow passage 76 may be positioned parallel with and above mixing passage 75 and the exhaust flow in the mixing flow passage may be substantially in the same direction as exhaust flow in the merged flow passage.

Figure 6:
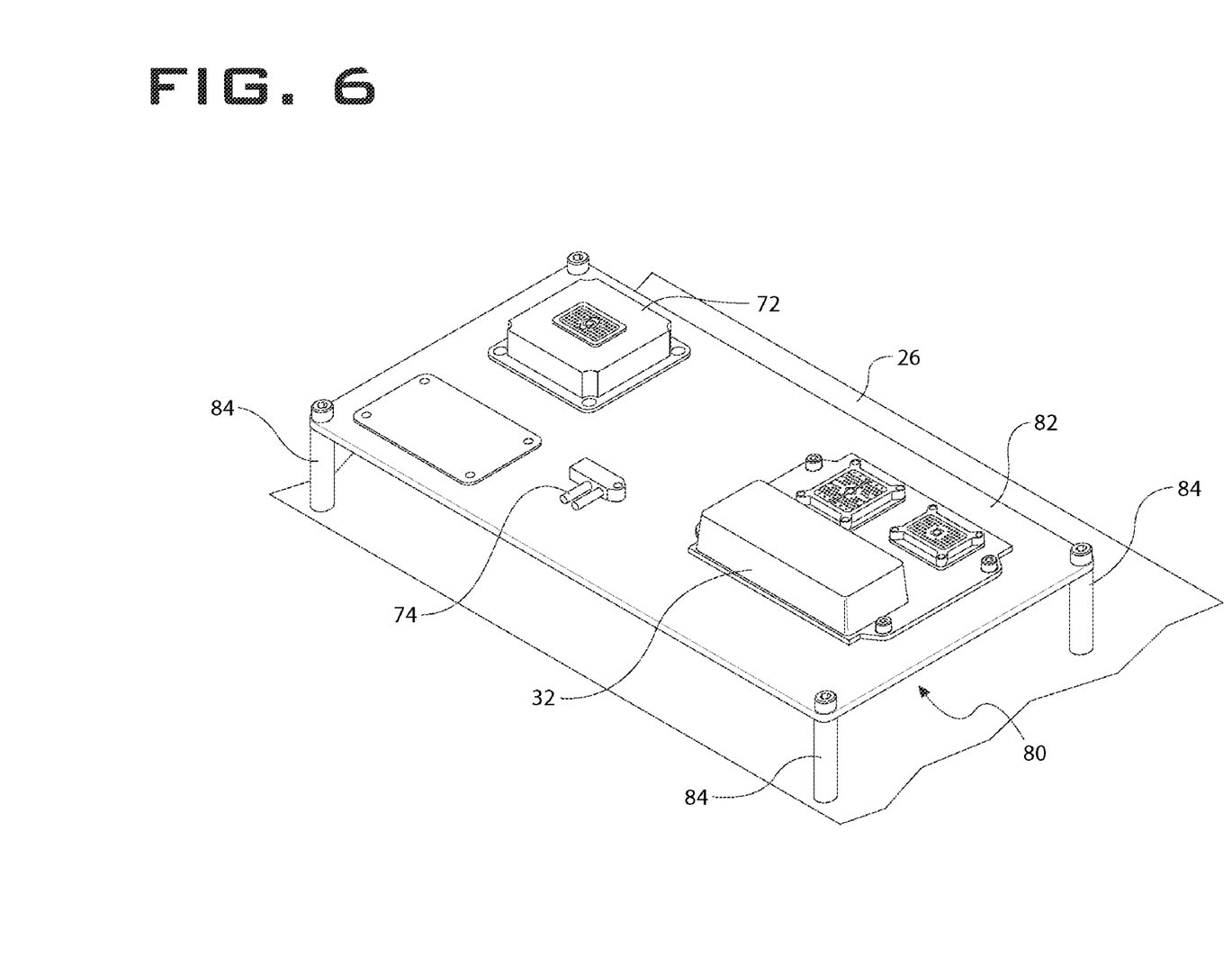
FIG. 6 is a diagrammatic illustration of a close-up view of electronics mounted on the after-treatment module in FIG. 3.

Referring to FIG. 6, housing 26 may include, affixed thereto, controller 32 and a signal processor 72 such that housing 26, controller 32, and signal processor 72 may be moved and installed as a single unit. The signal processor 72 may be configured to convert data collected from the various components within housing 26 to a machine language to a protocol recognized by other systems (e.g., a computer network in an industrial plant). For example, in some embodiments, signal processor 72 may be configured to convert machine data signals to internet protocol.

Since the exhaust passing through after-treatment module 20 may raise the temperature of the after-treatment module above a desirable temperature for the controller 32 and the signal processor 72, after-treatment module 20 may include a thermal isolating structure 80. The thermal isolating structure 80 may be configured in a variety of ways. Any structure capable of reducing the amount of heat from module 20 that controller 32 and signal processor 72 are exposed to may be used. In the depicted embodiment, the thermal isolating structure 80 may include a mounting plate 82 to which the signal processor and controller may be affixed to. The mounting plate 82 may be affixed to the housing 26 by stanchions 84 in such a manner that the mounting plate is spaced apart from the module outer surface and an air gap is formed between the mounting plate 82 and the housing 26.

Other components and devices may also be mounted onto mounting plate 82. For example, as shown in FIG. 6, a backpressure sensor 74, configured to measure backpressure in exhaust flowpath 14 upstream from particulate traps 36 and SCR catalyst 27 and a NOx sensor control unit and connector 86 may be affixed to mounting plate 82.

Figure 7:
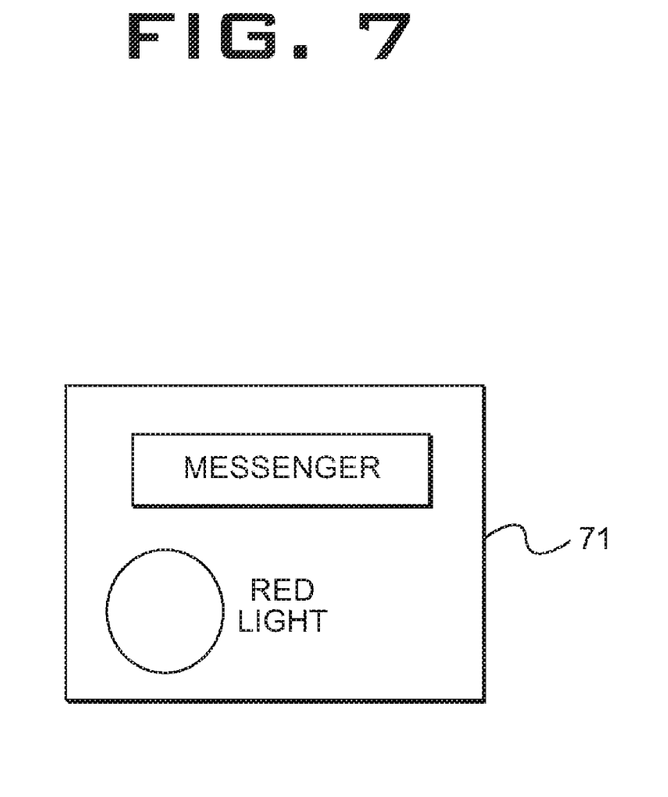
FIG. 7 is a diagrammatic illustration of a display according to an exemplary disclosed embodiment.
Figure 8:
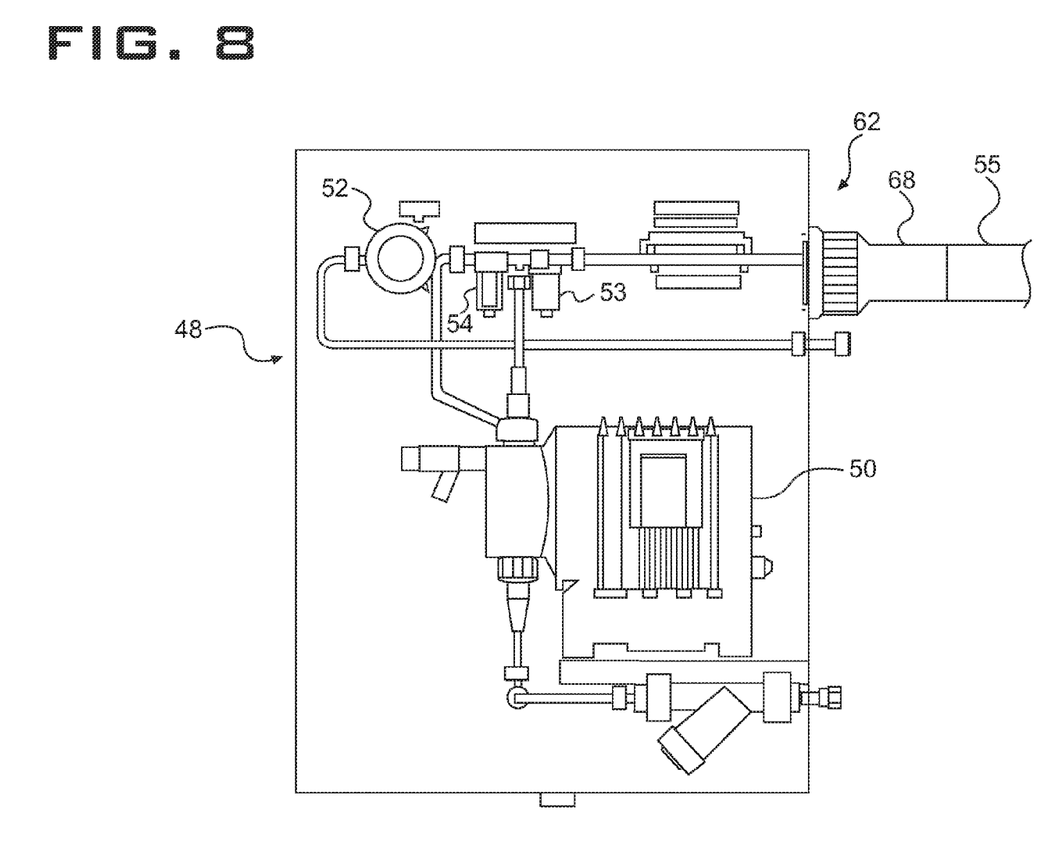
FIG. 8 is a diagrammatic illustration of a urea dosing cabinet according to an exemplary disclosed embodiment.

FIG. 7 shows a display 71 configured to display information and/or warnings related to after-treatment system 18. Display 71 may be located at any suitable location. When engine 10 is part of a mobile machine, for example, display 71 may be located on a dashboard viewable by an operator of the machine. When engine 10 is a stationary unit, display 71 may be located at any convenient location on or near engine 10 or module 20. For example, display 71 may be located on controller 32 or on mounting plate 82. Alternatively or additionally, display 71 may be displayed by, for example, a computer networked with ECM 60.

Industrial Applicability

The disclosed after-treatment system 18 including after-treatment module 20 may be applicable to any exhaust producing engine, including engines that run on gasoline, diesel, gaseous fuel (e.g., "natural gas"), etc. In some embodiments, engine 10 may be a dual-fuel type engine. After-treatment module 20 may be applicable to mobile systems, such as engines that power mobile vehicles (e.g., automobiles, semi-trailer trucks, construction equipment, marine vessels, etc.). After-treatment module 20 may also be applicable to stationary systems, such as electric power generation sets.

The disclosed configurations of after-treatment module 20 may substantially simplify and facilitate installation of after-treatment systems. After-treatment module 20 effectively consolidates several components of after-treatment system 18 such that the module may be sold, shipped, and installed as a single unit. For example, after-treatment module 20 may include SCR catalysts 27, particulate traps 36, and all, or substantially all, of the ducting, plumbing, wiring, electronics, etc. associated therewith. Therefore, embodiments of after-treatment module 20 may be considered to be "prefabricated," "pre-assembled," "plug and play," etc. Accordingly, instead of the many hours of labor and multiple tradesmen required to install separate, individual versions of the after-treatment components consolidated into after-treatment module 20, installation of after-treatment module 20 may be performed by virtually any mechanically inclined individual or team of individuals, in a relatively short amount of time.

This "plug and play" configuration may facilitate manufacturing (i.e., initial assembly) of engine systems. In addition, this configuration may also facilitate retrofitting of after-treatment systems to existing engine systems, such as for updating engine systems that are already in service.

In some embodiments, an exemplary method of installing after-treatment system 18 may include connecting an exhaust inlet of an after-treatment module and an exhaust outlet of the after-treatment module to the exhaust conduit. The method may also include positioning a urea storage tank relative to the exhaust system and positioning, in proximity to the exhaust system, a urea dosing module configured to regulate the amount of urea delivered from the urea storage tank to the after-treatment module. In addition, the method may include connecting interconnects between the after-treatment module, the urea storage tank, and the urea dosing module. In some embodiments, installation may include positioning and, in some cases mounting, dosing module 48, urea storage tank 46, and after-treatment module 20, connecting the interconnects between these components (i.e., ECM interconnect 66 and dosing interconnect 55), and connecting exhaust conduit 16 to exhaust inlet 22 and exhaust outlet 24.

It will be apparent to those having ordinary skill in the art that various modifications and variations can be made to the disclosed after-treatment system without departing from the scope of the disclosed system. Other embodiments of the disclosed system will be apparent to those having ordinary skill in the art from consideration of the specification and practice of the concepts disclosed herein. It is intended that the specification and examples be considered as exemplary only.

What is claimed is:

1. An after-treatment module, comprising:
a housing having an exhaust inlet and an exhaust outlet configured to be installed as part of an exhaust system of an exhaust producing engine such that at least a portion of the exhaust from the engine enters the housing through the exhaust inlet, flows through the housing, and exits the housing through the exhaust outlet;
at least one selective catalytic reduction (SCR) catalyst disposed within the housing and configured to facilitate a reduction reaction with $NO_x$ in the exhaust;
at least one $NO_x$ sensor disposed within the housing and configured to take measurements of an amount of $NO_x$ in the exhaust;
a thermal isolating structure connected directly to the housing, the thermal isolating structure including a mounting plate disposed at a distance from the housing such that an air gap is formed between the mounting plate and the housing; and
a controller connected to the mounting plate and configured to receive the $NO_x$ measurements from the $NO_x$ sensor.

2. The after-treatment module of claim 1, wherein the controller is further configured to receive data from an SCR inlet temperature sensor disposed within the housing.

3. The after-treatment module of claim 1, further including a wiring harness configured to operatively connect all components disposed within the housing with the exhaust system of the engine.

4. The after-treatment module of claim 1, wherein the at least one $NO_x$ sensor includes:
an inlet $NO_x$ sensor disposed at an exhaust inlet of the housing; and an outlet NO$_x$ sensor disposed at an exhaust outlet of the housing.

5. The after-treatment module of claim 1, further comprising a signal processor connected to the mounting plate such that the housing, the controller, and the signal processor are moveable and installable as a single unit.

6. An after-treatment system, comprising:
an after-treatment module configured to be installed in an exhaust system configured to carry exhaust gases produced by an engine such that at least a portion of the exhaust from the engine flows through the after-treatment module, the after-treatment module including:
a housing having an exhaust inlet and an exhaust outlet, wherein the portion of the exhaust from the engine enters the housing through the exhaust inlet, passes through the housing, and exits the housing through the exhaust outlet, the housing enclosing components disposed along a flow path of the exhaust gas passing through the housing, the component comprising:
a selective catalytic reduction (SCR) catalyst configured to facilitate a reduction reaction with NO$_x$ in the exhaust;
a particulate trap configured to remove particulate matter from the exhaust produced by the engine; and
at least one NO$_x$ sensor configured to take measurements of an amount of NO$_x$ in the exhaust passing through the housing;
a thermal isolating structure connected directly to the housing, the thermal isolating structure including a mounting plate disposed at a distance from the housing such that an air gap is formed between the mounting plate and the housing;
a controller connected to the mounting plate and configured to receive data from one or more of the components enclosed by the housing;
a urea storage tank; and
a urea dosing module configured to regulate the amount of urea delivered from the urea storage tank to the after-treatment module.

7. The after-treatment system of claim 6, wherein the after-treatment module is configured to be operatively connected to the urea dosing module via a single urea dosing interconnect.

8. The after-treatment system of claim 7, wherein the dosing interconnect includes a single wire tube bundle, which may provide communication of urea, air, and electrical signals between the after-treatment module and the dosing module.

9. The after-treatment system of claim 6, wherein the controller is configured to be operatively connected to an engine control module (ECM) configured to control operating parameters of the engine.

10. The after-treatment system of claim 9, wherein the controller is configured to communicate information about operating parameters of the urea storage tank, the urea dosing module and its components, and the after-treatment module and its components to the ECM.

11. The after-treatment system of claim 10, wherein the controller is configured to receive command information from the ECM for controlling at least one of the urea storage tank, the urea dosing module and its components, and the after-treatment module and its components.

12. The after-treatment system of claim 6, wherein the after-treatment module includes a wiring harness having one or more consolidated multi-pin connectors configured to operatively connect components of the after-treatment module with the ECM, the exhaust system, the urea dosing module, and the urea storage tank.

13. The after-treatment module of claim 6, wherein the controller and the housing are fixably connected as a single consolidated unit.

14. The after-treatment system of claim 6, further comprising a particulate regeneration device disposed within the housing.

15. The after-treatment system of claim 6, further comprising a signal processor connected to the mounting plate such that the housing, the controller, and the signal processor are moveable and installable as a single unit.

16. A method of installing an after-treatment system in an exhaust system of an exhaust producing engine, wherein the exhaust system includes an exhaust conduit, the method comprising:
connecting an exhaust inlet of an after-treatment module and an exhaust outlet of the after-treatment module to the exhaust conduit;
wherein the after-treatment module includes:
a housing that forms the exhaust inlet and the exhaust outlet, the housing being configured to be installed in an exhaust system of an exhaust producing engine such that at least a portion of the exhaust from the engine enters the housing through the exhaust inlet, flows through the housing, and exits the housing through the exhaust outlet;
at least one selective catalytic reduction (SCR) catalyst disposed along a flow path of the exhaust within the housing and configured to facilitate a reduction reaction with NO$_x$ in the exhaust;
at least one NO$_x$ sensor disposed within the housing along the flow path of the exhaust and configured to take measurements of an amount of NO$_x$ in the exhaust;
a thermal isolating structure connected directly to the housing, the thermal isolating structure including a mounting plate disposed at a distance from the housing such that an air gap is formed between the mounting plate and the housing; and
a controller connected to the mounting plate and configured to receive the NO$_x$ measurements from the sensor;
positioning a urea storage tank relative to the exhaust system;
positioning, in proximity to the exhaust system, a urea dosing module configured to regulate the amount of urea delivered from the urea storage tank to the after-treatment module; and
connecting interconnects between the after-treatment module, the urea storage tank, and the urea dosing module.

17. The after-treatment module of claim 1, further comprising a particulate trap disposed within the housing, the particulate trap configured to remove particulate matter from the exhaust.

18. The after-treatment module of claim 17, further comprising a particulate regeneration device disposed within the housing.

* * * * *